United States Patent
Akella et al.

(10) Patent No.: US 11,126,178 B2
(45) Date of Patent: Sep. 21, 2021

(54) VEHICLE CONTROL

(71) Applicant: Zoox, Inc., Foster City, CA (US)

(72) Inventors: Abishek Krishna Akella, Pleasanton, CA (US); Janek Hudecek, Redwood City, CA (US); Marin Kobilarov, Mountain View, CA (US); Marc Wimmershoff, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 204 days.

(21) Appl. No.: 16/251,788

(22) Filed: Jan. 18, 2019

(65) Prior Publication Data

US 2020/0233414 A1    Jul. 23, 2020

(51) Int. Cl.
| | |
|---|---|
| *G05D 1/00* | (2006.01) |
| *B60W 30/16* | (2020.01) |
| *B60W 30/165* | (2020.01) |
| *G05D 1/02* | (2020.01) |
| *G06K 9/00* | (2006.01) |

(52) U.S. Cl.
CPC ......... *G05D 1/0088* (2013.01); *B60W 30/162* (2013.01); *B60W 30/165* (2013.01); *G05D 1/0223* (2013.01); *G06K 9/00805* (2013.01); *G06K 9/00818* (2013.01); *G06K 9/00825* (2013.01); *B60W 2554/801* (2020.02);
(Continued)

(58) Field of Classification Search
CPC .. B60W 30/162; B60W 30/165; B60W 30/14; B60W 30/16; B60W 60/00; B60W 2720/106; G06K 9/00825
See application file for complete search history.

(56) References Cited

U.S. PATENT DOCUMENTS

| | | | |
|---|---|---|---|
| 2011/0098886 A1* | 4/2011 | Deng | G08G 1/166 |
| | | | 701/41 |
| 2013/0116909 A1* | 5/2013 | Shida | B60K 31/00 |
| | | | 701/96 |

(Continued)

FOREIGN PATENT DOCUMENTS

| | | |
|---|---|---|
| DE | 4200694 A1 | 7/1993 |
| DE | 19654769 A1 | 7/1998 |
| JP | WO2018029758 A1 | 6/2019 |

OTHER PUBLICATIONS

The PCT Search Report and Written Opinion dated May 13, 2020 for PCT Application No. PCT/US2020/014008, 13 pages.

(Continued)

*Primary Examiner* — Michael J Zanelli
(74) *Attorney, Agent, or Firm* — Lee & Hayes, P.C.

(57) ABSTRACT

Command determination for controlling a vehicle, such as an autonomous vehicle, is described. In an example, individual requests for controlling the vehicle relative to each of multiple objects or conditions in an environment are received (substantially simultaneously) and based on the request type and/or additional information associated with a request, command controllers can determine control commands (e.g., different accelerations, steering angles, steering rates, and the like) associated with each of the one or more requests. The command controllers may have different controller gains (which may be based on functions of distance, distance ratios, time to estimated collisions, etc.) for determining the controls and a control command may be determined based on the all such determined controls.

19 Claims, 3 Drawing Sheets

(52) U.S. Cl.
CPC ... *B60W 2554/804* (2020.02); *B60W 2555/60* (2020.02); *G05D 2201/0213* (2013.01)

(56) References Cited

U.S. PATENT DOCUMENTS

| | | | |
|---|---|---|---|
| 2017/0102701 A1* | 4/2017 | Pack | G05D 1/0248 |
| 2017/0355368 A1 | 12/2017 | O'Dea et al. | |
| 2018/0001764 A1* | 1/2018 | Bang | B60K 31/0008 |
| 2019/0113918 A1* | 4/2019 | Englard | G05D 1/024 |
| 2020/0070849 A1* | 3/2020 | Suzuki | B60W 40/109 |

OTHER PUBLICATIONS

The International Preliminary Report on Patentability dated Jul. 29, 2021 for PCT Application No. PCT/US2020/014008, 9 pages.

\* cited by examiner

VEHICLE CONTROL

BACKGROUND

Planning systems in vehicles, e.g., autonomous vehicles, utilize information associated with objects in an environment (e.g., dynamic agents, static agents) and attributes of the environment (e.g., speed limit, weather conditions) to determine actions for navigating through the environment. For example, some existing systems control a vehicle to slow down and/or stop upon determining that an object is likely to enter a drive path of the vehicle or in response to identifying a red light or traffic congestion. However, in more complex driving environments, e.g., in which multiple static objects, dynamic objects, and/or environmental conditions may impact travel, it may be difficult to determine an accurate command for the vehicle to traverse the environment. For instance, the impact of certain objects may be over- or under-estimated, which could result in abrupt acceleration or deceleration, making travel unpleasant for the rider.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
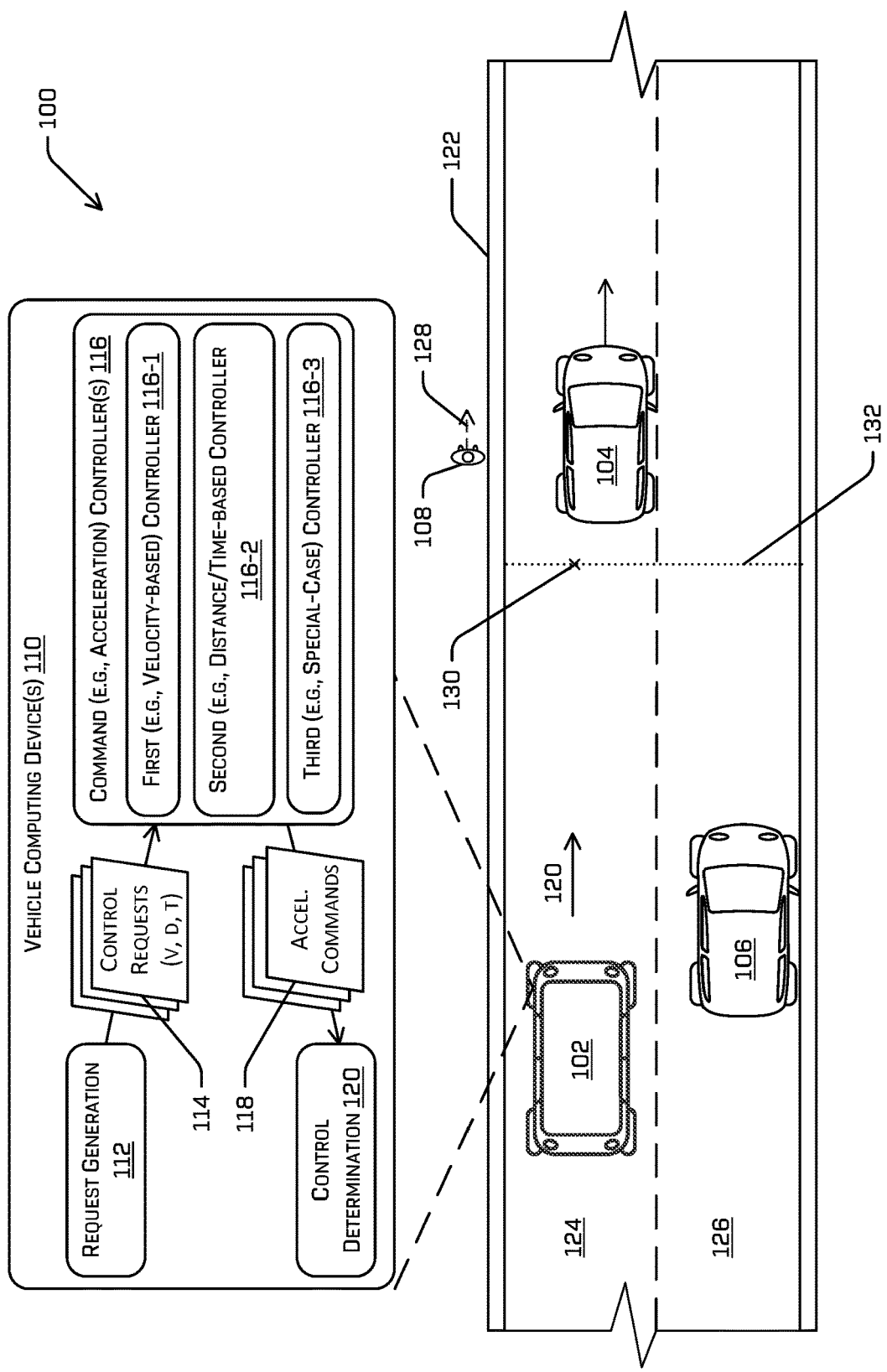
FIG. 1 is a schematic diagram illustrating an example implementation of vehicle control in an environment as described herein.

Techniques described herein are directed to responsive control of a vehicle, such as an autonomous vehicle, in an environment. For example, in implementations described herein, a control (such as an acceleration, steering angle, torque, etc.) of a vehicle along a planned path may be determined by considering a plurality of different objects (e.g., dynamic obstacles, including but not limited to pedestrians, animals, cyclists, trucks, motorcycles, other vehicles, or the like, static obstacles, including but not limited to parked vehicles, stopped vehicles, or the like, traffic control objects, including but not limited to posted speed limits, and/or other objects or conditions that may affect travel and operation of the autonomous vehicle) in an environment of the vehicle and/or the predicted actions of those objects. For example, the vehicle may determine a different acceleration, e.g., a longitudinal acceleration, for responding to each of a plurality of objects or conditions in the environment.

As a non-limiting example, a computing device of an autonomous vehicle may receive control requests for responding to objects and/or conditions in the environment. For instance, in some examples, the computing device may receive information associated with an upcoming stop sign, information about a leading vehicle, e.g., in front of the controlled vehicle, and information about a posted speed limit. Based on such information, the computing device may generate and/or receive a first request to stop at the detected stop sign, e.g., at a distance ahead, a second request to follow the leading vehicle, e.g., by maintaining both the same speed as the leading vehicle and a time gap defining a spacing from the leading vehicle, and a third request to maintain a velocity associated with the posted speed limit. As described, the first request may include a physical distance at which to reach zero velocity, the second request may include a velocity and a time associated with a distance, and the third request may include a velocity. Thus, each of the requests may include different information, e.g., velocity, distance, time, and some requests may contradict each other, e.g., in the example given, the vehicle cannot maintain a speed limit and stop for a stop sign.

In some examples, the computing device can determine controls, for example, an acceleration, e.g., a longitudinal acceleration along a travel path or trajectory, of the autonomous vehicle for each of the requests. Continuing the example above, the computing device can determine a first acceleration, e.g., a deceleration, that will cause the vehicle to stop for the stop sign to execute the first request. The computing device can also determine a second acceleration for matching the speed of the leading vehicle and maintaining the desired time gap to execute the second request, and the computing device can determine a third acceleration for obtaining the speed limit to execute the third request. As will be appreciated, in some examples, the computing device may calculate as many accelerations as received control requests, detected objects and/or travel-related conditions.

In some examples, in addition to the velocity, time, and/or distance information, the command accelerations may be determined based on additional information. For example, the received requests for responding to the objects or conditions may provide the additional information. By way of non-limiting example, the additional information can include constraints which may include a minimum and/or maximum time gap, velocity, and/or acceleration allowable for the given request. The additional information may also include other information about request prioritization. For example, the request may include information to determine an increased acceleration for a specific request, e.g., to assertively traverse through a congested area, or information to de-prioritize requests that may be less important. Other additional information may include special instructions for considering certain objects, e.g., by instructing a controller to consider an object as stationary or to associate a fixed trajectory with an object.

In some implementations, the computing device can include different controllers for determining accelerations based on different input requests. For example, when the input request includes a request to attain a velocity, e.g., a posted speed limit, at a specified distance from a current position, the command acceleration associated with the input request may be determined by a first controller having a first controller gain. In some instances, the first controller gain may be predetermined or may be a function of the distance. In other examples, e.g., in which the input request is a command to follow an object, such as a leading vehicle, or to stop at a position, the command acceleration associated with the input command may be determined by a second controller. For example, the second controller may have a second controller gain. The second controller gain may be predetermined or may be a function of the distance from the object, the distance to the stopping point and/or a time to reach the object and/or the stopping point. The gain may also be determined based at least in part on the additional information received with the request.

In some aspects, a command (e.g., an acceleration) can be determined for each request, and the determined command accelerations can be used to determine an actual control acceleration for the vehicle. For example, a plurality of command accelerations can be generated for a specific time, e.g., a timestep, and the control acceleration for that time may be determined based on the control accelerations corresponding to that time. In some instances, the control accelerations can be determined based at least in part on a weighted average of the command accelerations, or otherwise determined in accordance with an optimization or determination. For example, the computing device can associate a weighting factor with each of the command accelerations, and the weighting factor can be based on the additional information received with the respective requests. The control acceleration may be used to control the vehicle.

Unlike conventional systems, aspects of this disclosure may be inclusive of more events when determining a command (such as a control acceleration), and may determine acceleration differently for different objects, e.g., by using different controllers based on the input command. Such unique command (acceleration) determinations may provide for improved control with respect to objects and/or environmental conditions as opposed to such conventional systems. The techniques described herein may result in a smoother ride for passengers and increased safety for the autonomous vehicle and/or objects in the environment.

Techniques described herein also are directed to leveraging sensor and perception data to enable a vehicle, such as an autonomous vehicle, to increase a level of safety associated with navigating through an environment while circumventing objects in the environment, in addition to providing a pleasant riding experience. Techniques described herein can utilize multiple command controllers to determine a vehicle acceleration (and/or other controls) along a drive path such that the vehicle can travel relative to those objects in a more efficient manner and/or with increased comfort to passengers than with existing navigation techniques. For example, techniques described herein may provide a technological improvement over existing prediction and navigation technology. In addition to improving the accuracy with which sensor data can be used to determine the vehicle acceleration, techniques described herein can provide a smoother ride and improve safety outcomes by, for example, more accurately determining a safe speed at which the vehicle may operate to reach an intended destination. Techniques described herein may also reduce component wear and energy requirements associated with the vehicle. For example, existing techniques may more harshly brake and/or accelerate, putting additional and unnecessary stress on vehicle components.

Figure 2:
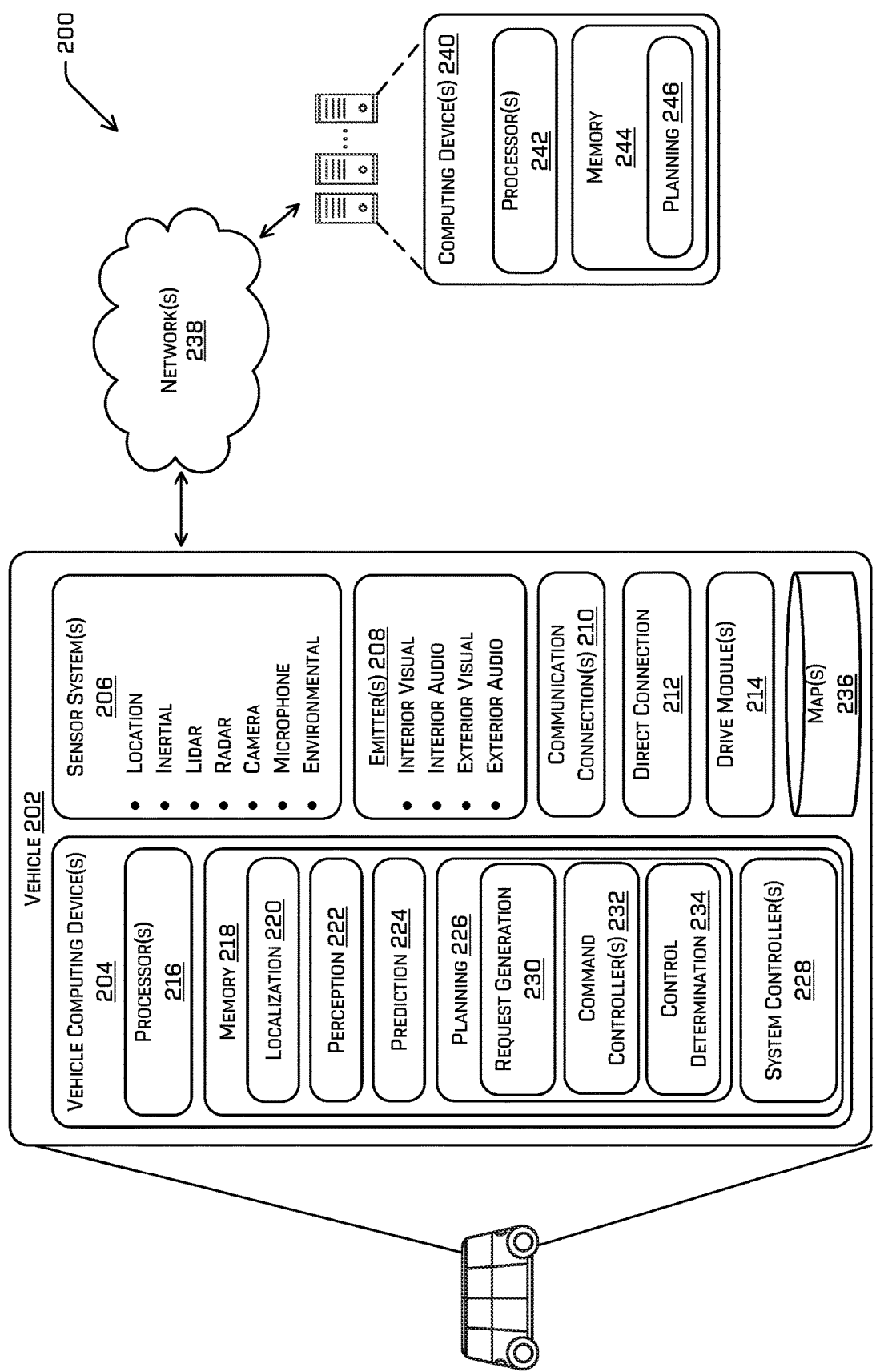
FIG. 2 is a block diagram illustrating an example computing system for vehicle control as described herein.
Figure 3:
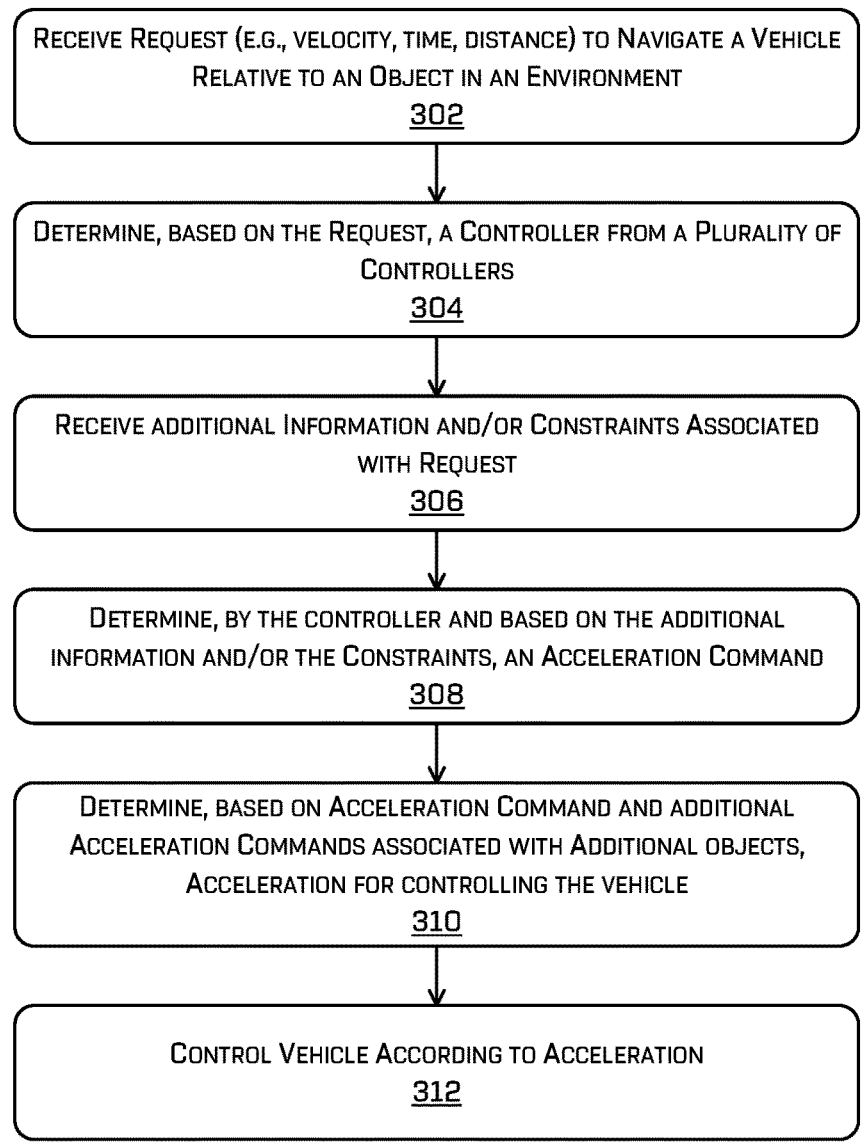
FIG. 3 is a flowchart illustrating an example method for navigating a vehicle through an environment using vehicle control, as described herein.

FIGS. 1-3 provide additional details associated with techniques described herein.

FIG. 1 is a schematic diagram illustrating an example implementation of responsive control of a vehicle through an environment as described herein. More specifically, FIG. 1 illustrates an example environment 100 in which a vehicle 102 is operating. In the illustrated example, the vehicle 102 is driving in the environment 100, although in other examples the vehicle 102 may be stationary and/or parked in the environment 100. One or more objects, or agents, also are in the environment 100. For instance, FIG. 1 illustrates a first additional vehicle 104 and a second additional vehicle 106 (collectively, "the additional vehicles 104, 106") and a pedestrian 108. Although not illustrated, any number and/or type of objects, including static objects, e.g., road signs, parked vehicles, fire hydrants, buildings, curbs, or the like, dynamic objects, e.g., pedestrians, animals, cyclists, trucks, motorcycles, other vehicles, or the like, and/or other traffic control objects, e.g., speed limit signs, stop signs, traffic lights, or the like, can additionally or alternatively be present in the environment 100.

The vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In the example of FIG. 1, the vehicle 102 can include one or more vehicle computing devices 110. In some implementations, the vehicle computing device(s) 110 can recognize the one or more objects, e.g., the additional vehicles 104, 106 and/or the pedestrian 108, for example, using the sensor data. In some examples, the vehicle 102 may include one or more sensor systems (not shown), which can include, but is/are not limited to, light detection and ranging (LIDAR) sensors, radio detection and ranging (RADAR) sensors, time-of-flight sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), etc.

In at least one example, the vehicle computing device(s) 110 can include a perception system (not shown in FIG. 1), which can perform object detection, segmentation, and/or classification based at least in part on sensor data received from the sensor system(s). For instance, the perception system can detect the additional vehicles 104, 106 and/or the pedestrian 108 in the environment 100 based on the sensor data generated by the sensor system(s). Additionally, the perception system can determine an extent of the additional vehicles 104, 106 and/or the pedestrian 108 (e.g., height, width, length, etc.), a pose of the additional vehicles 104, 106 and/or the pedestrian 108 (e.g., x-coordinate, y-coordinate, z-coordinate, pitch, roll, yaw), and/or additional attributes of the additional vehicles 104, 106 and/or the pedestrian 108. The sensor system(s) can continuously generate the sensor data (e.g., in near-real time), which can be utilized by the perception system (and/or other systems of the vehicle computing device(s) 110).

The vehicle computing device(s) 110 can also include a request generation system 112, which can determine one or more control request(s) 114. For example, each of the control request(s) 114 can include information for controlling the vehicle 102 relative to an object detected in the environment or some other condition or feature in the environment. In the example of FIG. 1, the request generation system 112 may determine a first control request of the control requests 114 for navigating relative to the first additional vehicle 104, a second control request of the control requests 114 for navigating relative to the second additional vehicle 106, and a third control request of the control requests 114 for navigating relative to the pedestrian 108. Additional control requests may also be generated in response to additional objects or conditions in the environment 100. For instance, the environment may have an associated speed limit e.g., as posted on a traffic sign, and the response commands 114 may include a command for attaining and/or maintaining a velocity associated with the posted speed limit. Similarly, in other embodiments, other objects or environment conditions may also result in the request generation system 112 determining additional control requests 114. Such objects and/or conditions may include, but are not limited to, traffic lights, stop signs, yield signs, merging traffic, or the like. In implementations described herein, the control requests 114 may include one or more of a reference velocity, reference distance (e.g., a distance within which to attain a requested velocity), and/or a reference time (e.g., a time within which to attain a requested velocity) associated with performing the control request 114. Thus, in an example in which a control request 114 includes a request to obey a posted speed limit, the control request 114 may include a velocity associated with the posted speed limit. In addition to the velocity associated with speed limit, the control request 114 may also include a distance at which the vehicle 102 should reach the target velocity. Though only several control requests are enumerated above, it is understood that there may be additional, or fewer, type (or classes) of control requests selected based on how the vehicle 102 is to respond to various situations in the environment.

As described, the request generation system 112 will generate a control request 114 for each of several objects and/or conditions in the environment 100 of the vehicle 102. The control requests may come in many different formats, e.g., depending on the object to be controlled relative to and/or the desired action to be taken (e.g., different types and/or classes of control requests). As a non-limiting example, one control request type may comprise a request to follow a vehicle (e.g., vehicle 104) at a given velocity, whereas another control request may comprise a stop request (e.g., for stopping at a stop sign). In such an example, each control request may correspond to different kinematics, safety protocols, and the like. Accordingly, the vehicle computing device 110 may also include one or more command controllers 116 configured to determine control (e.g., acceleration) commands 118 corresponding to each of the control requests 114. In some examples, the command controllers 116 may determine the control commands 118 using one or more equations. For example, and as described further herein, different command controllers 116 may be used depending upon the type of control request 114 received. In some instances, different command controllers of the command controllers 116 may comprise different dynamics and/or kinematics to attain the requested control (e.g., via the use of different controller gains to determine the acceleration commands 118). For example, a first command controller 116-1 may have a controller gain that is gain-scheduled as a function of a velocity, e.g., a relative velocity. For example, the first command controller 116-1 may be used to determine an acceleration for a control request 114 that includes a velocity. A second command controller 116-2 may have a controller gain that is gain-scheduled as a function of distance and/or time. For example, the distance may be a distance from a predetermined position, which may be a position in space, or a distance to an object in the environment. In implementations in which the second controller gain is gain-scheduled as a function of time, the time may be, as a non-limiting example, a time to collision with an object. However, in alternate, or additional, examples, such a time may be determined so as to provide a comfortable experience for the passengers, or otherwise account for safety. A third command controller 116-3 also is illustrated, and may include one or more controllers specific to one or more special cases. For example, the third controller may use a predetermined gain in calculating the acceleration commands 118. Although FIG. 1 illustrates three command controllers 116, more or fewer controllers may be provided. In implementations described herein, the command controllers 116 may generate the acceleration commands 118 best suited to comply with the individual control requests 114. Further, though depicted in FIG. 1 and described above for illustrative purposes as acceleration commands 118 may further comprise, in some examples, steering, rate of steering, and the like.

In some implementations, the control requests 114, and thus the acceleration commands 118, may be at odds with each other. For example, a first control request may be a request to obey a posted speed limit, whereas a second control request 114 may be a request to follow an object, such as the first additional vehicle 104. When the first additional vehicle 104 is travelling at the posted speed limit the vehicle 102 can comply with both requests. However, when the additional vehicle accelerates above or decelerates below the posted speed limit, the command controllers 116 may generate different acceleration commands 118, e.g., a first acceleration, such as a zero-acceleration, to maintain the speed limit and a second acceleration to maintain a distance from the first additional vehicle 104. As will be appreciated, additional acceleration commands 118 may also be generated, in accordance with additional control requests.

To arbitrate among the multiple acceleration commands, the vehicle computing device(s) 110 can further include a control determination system 120 for generating a control command, e.g., for controlling the vehicle 102. For example, the control determination system 120 can determine a command (e.g., a single, longitudinal acceleration) based at least in part on each of the acceleration commands 118. In some examples, the request generation system 112 can generate the control requests 114 at intervals, e.g., periodic intervals, as objects or conditions are identified, or the like. And, the command controller(s) 116 can process the requests 114 to generate the acceleration commands 118 at intervals, e.g., periodic intervals, as requests are received, or the like. In some examples, the control determination system 120 can determine a command acceleration based on all commands generated for a specific time frame or time period. Thus, the command acceleration may be a longitudinal acceleration for a specific point (or time) on a trajectory or travel path. Moreover, because the vehicle computing device(s) 110 may predict actions and environmental features into the future, e.g., over some time horizon, the control determination system 120 can determine command accelerations using the techniques described herein for additional points (or times) on the trajectory or travel path. In some examples, this prediction may include updating a position of the vehicle 102 and/or objects in the environment as anticipated over time (e.g., based on controls associated with the vehicle 102 and/or based on expected positions, accelerations, velocities, etc. associated with a predicted trajectory of the vehicle and/or the objects). As a non-limiting example, such commands determined by the control determination system 120 may comprise arbitration of multiple acceleration commands 118 for each of 1 s, 2 s, 3 s, and 4 s (or 1 m, 2 m, 3 m, and 4 m, etc.) of future predicted vehicle travel to determine a trajectory to be followed by the vehicle 102, though any number of such points (either in time and/or in space), and any spacing between, is contemplated.

In a more detailed example, FIG. 1 may illustrate a scenario in which the vehicle 102 is travelling through the environment 100, generally in the direction of arrow 120. The vehicle 102 is travelling on a road 122 having a first lane 124 and a second lane 126. The vehicle 102 is in the first lane 124, behind the first additional vehicle 104, and, in the example, may be travelling relatively the same speed as the first additional vehicle 104. For example, the request generation system 112 may generate a control request 114 to maintain a relatively constant distance from the rear of the first additional vehicle 104. In some instances, the control request 114 may express the distance as a time gap to maintain between vehicle 102 and the first additional vehicle 104. Such a control request 114 may be in accordance with a policy of the vehicle 102 (e.g., a policy which dictates that, where possible, follow a leading vehicle). Generally, the time gap may be a difference between a first time at which the first additional vehicle 104, as the leading vehicle, passes a position and a second time at which the vehicle 102 passes the position. Thus, as will be appreciated, the actual, physical distance between the first additional vehicle 104 and the vehicle 102 may vary based on the velocity of the first additional vehicle 104 (and the vehicle 102). In other instances, the control request may also include acceleration information about the first additional vehicle 104. Based on the control request 114 to maintain the time gap relative to the first additional vehicle 104, the command controllers 116, e.g., the second controller 116-2, may determine an acceleration command for attaining and/or maintaining the requested time gap.

In the example illustrated in FIG. 1, the control request 114 to follow the first additional vehicle 104 may be only one control request. For example, the pedestrian is illustrated as proceeding along a trajectory 128 and in response to the presence of the pedestrian 108 and/or the trajectory 128, the request generation system 112 may also generate a control request 114 to slow down, e.g., because the pedestrian could enter the first lane 124, e.g., to jaywalk across the road 122. Thus, in this example, another control request 114 may include a request to decelerate, e.g., to a lower, reference velocity at a predetermined distance from a current position. For example, the distance may be a distance between the current position of the vehicle 102 and a position 130 on an imaginary line 132 some distance ahead. Such distances and velocities may be determined in accordance with the policy (e.g., to ensure that the velocity of vehicle 102 does not meet or exceed a maximum velocity within a radius of a pedestrian). In the example, the position 130 and/or the imaginary line 132 may be determined as a line/position relative to the current position of the pedestrian 108. Thus, the control request 114 may be a control request associated with a possible encroachment of the pedestrian 108 into the first lane 124 and may be expressed as a velocity, e.g., a lower velocity than a current velocity, and a distance at which to achieve the lower velocity, e.g., the distance to the position 130 and/or the line 132. Based on the control request 114 generated based on the pedestrian 108, the command controller(s) 116, e.g., the first controller 116-1, may determine an acceleration command for slowing the vehicle 102 by the line 132.

In the example of FIG. 1, the acceleration command to follow the first additional vehicle 104 may be determined using the second command controller 116-2 and the acceleration command to slow the vehicle in anticipation of approaching the pedestrian 108 can be determined using the first command controller 116-1. In some examples, the second command controller 116-2 may include a controller gain that is gain-scheduled based at least in part on a distance of the vehicle 102 to the first additional vehicle 104, a desired distance between the vehicle 102 and the first additional vehicle 104, and/or a time until the vehicle 102 will contact the first additional vehicle 104. The first command controller 116-1 may include a second gain that is gain-scheduled based at least in part on a distance to the target stopping location, e.g., the point 130. Thus, in the example of FIG. 1, as the vehicle 102 approaches the point 130 more closely, the gain function may cause the vehicle 102 to decelerate more quickly, e.g., to achieve the desired velocity at the position 130.

Continuing the example, the acceleration commands 118 may be received at the control determination system 120, which may determine and output a control acceleration. For example, the control determination system 120 may calculate a weighted average of the two received control commands, may choose one of the acceleration commands 118 as the control acceleration, or may otherwise arbitrate among the acceleration commands.

FIG. 1 illustrates a single example of navigating an environment using vehicle control techniques. Other examples also are contemplated. For example, although FIG. 1 illustrates only the two additional vehicles 104, 106 and the pedestrian 108, objects and/or events also are contemplated. For example, a vehicle entering the road 122, e.g., from a driveway or an intersecting street, zipper merges on highways, and the like may be considered according to techniques described herein. In other examples, in tightly congested areas, e.g., in which many obstructions may make proceeding difficult, techniques described herein may cause the vehicle to proceed slowly along a trajectory, e.g., to reduce occlusions, or to otherwise "assertively" move through the intersection. In implementations, for example, the control request may include an indication that the command controller 116 should adjust the gain when determining the corresponding acceleration command 118 or use a specific command controller 116, e.g., which may utilize a different gain. Any object or event that could impact the travel of the vehicle 102 may be used as the basis for generating a control request 114 with the command controllers 116 generating associated acceleration commands 118. As also described herein, the acceleration commands 118 may all be considered by the control determination system 120. Several other examples are discussed further herein.

FIG. 2 is a block diagram illustrating an example system 200 for implementing responsive control of a vehicle through an environment as described herein. In at least one example, the system 200 can include a vehicle 202, which can be the same as the vehicle 102 described above with reference to FIG. 1. The vehicle 202 can include one or more vehicle computing devices 204, one or more sensor systems 206, one or more emitters 208, one or more communication connections 210, at least one direct connection 212, and one or more drive modules 214. In at least one example, the vehicle computing device(s) 204 can correspond to the vehicle computing device(s) 110 described above with reference to FIG. 1.

The vehicle computing device(s) 204 can include processor(s) 216 and memory 218 communicatively coupled with the processor(s) 216. In the illustrated example, the vehicle 202 is an autonomous vehicle; however, the vehicle 202 could be any other type of vehicle. In the illustrated example, the memory 218 of the vehicle computing device(s) 204 stores a localization system 220, a perception system 222, a prediction system 224, a planning system 226, and one or more system controllers 228. Although these systems and components are illustrated, and will be described below, as separate components for ease of understanding, functionality of the various systems, components, and controllers may be attributed differently than discussed. By way of non-limiting example, functionality attributed to the perception system 222 may be carried out by the localization system 220 and/or the prediction system 224. Fewer or more systems and components may be utilized to perform the various functionalities described herein. Furthermore, though depicted in FIG. 2 as residing in memory 218 for illustrative purposes, it is contemplated that the localization system 220, the perception system 222, the prediction system 224, the planning system 226, and/or the one or more system controllers 228 can additionally, or alternatively, be accessible to the vehicle 202 (e.g., stored on, or otherwise accessible by, memory remote from the vehicle 202).

As also illustrated in FIG. 2, the vehicle 202 can also include a map storage 236. For example, the map storage 236 may store one or more maps. A map can be any number of data structures modeled in two dimensions or three dimensions and capable of providing information about an environment, such as, but not limited to, topologies (such as intersections), streets, mountain ranges, roads, terrain, and the environment in general.

In at least one example, the localization system 220 can include functionality to receive data from the sensor system(s) 206 to determine a position and/or orientation of the vehicle 202 (e.g., one or more of an x-, y-, z-position, roll, pitch, or yaw). For example, the localization system 220 can include and/or request/receive a map of an environment (e.g., from the map storage 236) and can continuously determine a location and/or orientation of the vehicle 202 within the map. In some instances, the localization system 220 can utilize simultaneous localization and mapping (SLAM) techniques, calibration, localization and mapping, simultaneously, techniques, relative SLAM techniques, bundle adjustment, non-linear least squares optimization, differential dynamic programming, or the like to receive image data, LIDAR data, radar data, IMU data, GPS data, wheel encoder data, and the like to accurately determine a location of the autonomous vehicle. In some instances, the localization system 220 can provide data to various components of the vehicle 202 to determine an initial position of an autonomous vehicle for generating a candidate trajectory for travelling in the environment.

In some instances, the perception system 222 can include functionality to perform object detection, segmentation, and/or classification. In some examples, the perception system 222 can provide processed sensor data that indicates a presence of an object that is proximate to the vehicle 202, such as the additional vehicles 104, 106 and/or the pedestrian 108. The perception system 222 may also determine a classification of the entity as an entity type (e.g., car, pedestrian, cyclist, animal, building, tree, road surface, curb, sidewalk, unknown, etc.). For instance, the perception system 222 may compare sensor data to stored object information to determine the classification. In additional and/or alternative examples, the perception system 222 can provide processed sensor data that indicates one or more characteristics associated with a detected object and/or the environment in which the object is positioned. In some examples, characteristics associated with an object can include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

The prediction system 224 can access sensor data from the sensor system(s) 206, map data from the map storage 236, and, in some examples, perception data output from the perception system 222 (e.g., processed sensor data). In at least one example, the prediction system 224 can determine features associated with the object based at least in part on the sensor data, the map data, and/or the perception data. As described above, features can include an extent of an object (e.g., height, weight, length, etc.), a pose of an object (e.g., x-coordinate, y-coordinate, z-coordinate, pitch, roll, yaw), a velocity of an object, an acceleration of an object, and a direction of travel of an object (e.g., a heading). Moreover, the prediction system 224 may be configured to determine a distance between an object and a proximate driving lane, a width of a current driving lane, proximity to a crosswalk, semantic feature(s), interactive feature(s), etc.

The prediction system 224 can also analyze features of objects to predict future actions of the objects. For instance, the prediction system 224 can predict lane changes, decelerations, accelerations, turns, changes of direction, or the like. The prediction system 224 can send prediction data to the planning system 226, e.g., so that the request generation system 230 can, using the prediction data, determine an appropriate action for controlling the vehicle 202 relative to an object. For instance, the prediction system 224 can generate prediction data indicative of a likelihood that an object will enter a travel path and/or otherwise interfere with a current path and/or trajectory of the vehicle 202.

In general, the planning system 226 can determine a path along which the vehicle 202 can traverse through an environment. For example, the planning system 226 can determine various routes and trajectories and various levels of detail. The planning system 226 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning system 226 can generate an instruction for guiding the autonomous vehicle along at least a portion of the route from the first location to the second location. In at least one example, the planning system 226 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 202 to navigate. Thus, in example implementations described herein, the planning system 226 may generate trajectories along which the vehicle can navigate, with the trajectories being along a travel path.

In implementations of this disclosure, and in more detail, the planning system 226 may periodically determine control signals for operating the vehicle 202, e.g., relative to objects and/or conditions in an environment of the vehicle 202. For instance, and as noted above, the planning system 226 may include a request generation system 230 (which may be the same as or similar to the request generation system 112), one or more command controllers 232 (which may be the same as or similar to the command controller(s) 116), and a control determination system 234 (which may be the same as or similar to the control determination system 120).

The request generation system 230 can determine requests for commanding the vehicle 202, e.g., relative to objects, conditions, and/or features affecting travel (or potentially affecting travel) of the vehicle 202. For example, the request generation system 230 can generate the control requests 114 illustrated in FIG. 1. The example control requests may include one or more of velocity information, distance information, time information, and/or acceleration information for executing a single command, e.g., relative to a single object, feature, or object. In one example, a control request generated by the request generation system 230 may include a request to follow an object, such as a leading vehicle. In such an example, the request to follow the object may include information about the object. For example, the request may include a velocity of the object and/or, if known, acceleration information about the object. The request to follow the object may also include a distance to maintain behind the object. In some examples, the distance may be expressed as a time gap. For example, the time gap may define a time difference between a first time at which a first, e.g., leading, object passes a reference point and a second time at which the vehicle passes the reference point. Thus, for example, when the vehicle 202 is requested to maintain a 1.5 second time gap behind a leading vehicle, the vehicle will pass a reference point 1.5 seconds later than the leading vehicle. As will be appreciated, when the leading vehicle and the vehicle 202 are travelling at 15 m/s, the vehicle 202 will be 10 meters behind the leading vehicle, whereas when the leading vehicle and the vehicle 202 are travelling at 3.0 m/s, the vehicle 202 will be 2 meters behind the leading vehicle. Thus, the time gap may be used to determine a velocity-dependent distance. However, in other embodiments, the request to follow the object may include a physical distance to maintain behind the object, e.g., regardless of a speed of the followed object.

Another example request that may be generated by the request generation system 230 can be a request to attain and/or maintain a target velocity. For instance, the target velocity may be related, at least in part, to a speed limit of a road on which the vehicle is travelling. For example, the velocity may correspond to the posted speed limit, to a speed that is a predetermined amount faster, e.g., 5 miles-per-hour, to a speed that is a predetermined amount slower, e.g., 2 miles-per-hour, or the like. In other examples, the target velocity may be a reduced velocity based on an identification of an upcoming reduced speed limit, an upcoming intersection (e.g., determined from map data), or upcoming traffic congestion, or other factors.

Another example request that may be generated by the request generation system 230 can be a request to attain a desired velocity at a distance from a current position. For instance, such a request may include an indication of the desired velocity as well as an indication of the distance. Such a request may be used, for example, in an instance in which it is desirable to slow the vehicle to a slower velocity in anticipation of upcoming traffic congestion. In other examples, this request may be used in response to identifying an upcoming speed limit change, e.g., in identifying a speed limit sign in the distance. In such an example, the request may include a velocity related to the speed limit on the sign and a distance to the sign.

The request generation system 230 can also generate a request to stop the vehicle. For example, such a request may include a distance or a position at which the vehicle should come to a stop. Such a request may include an indication of zero velocity, as well as a distance in which the vehicle should come to the stop. In some instances, the distance may be a distance to a position associated with, e.g. short of or at, a stop sign, crosswalk, intersection, or the like.

According to the foregoing, different control requests may be generated in response to different objects, e.g., other vehicles, pedestrians, or the like, or some environmental condition, e.g., a posted speed limit, a topographical feature, a crosswalk, an intersection, or the like. In some examples, the request generation system 230 may determine the control request(s) based on any number of criteria, including but not limited to the type of object or feature, the proximity of the object or feature to the vehicle, a predicted action or trajectory of the vehicle and/or the object, or the like. In some instances, the request generation system 230 can receive information from the perception system 222 and/or the prediction system 224 and determine the control request(s) based on such information. By way of non-limiting example, if the perception system 222 identifies a pedestrian, the prediction system 224 may determine that the pedestrian is walking along a road, and, in response, the request generation system may generate a request to follow the pedestrian. However, if the prediction system 224 determines that the pedestrian may cross the road, the request generation system 230 may generate a request to stop for the pedestrian. Moreover, depending upon the type of the control request, the request generation system 230 may provide different information along with the request. Such information may include one or more of a velocity, a distance, and/or a time, e.g., a time-gap for maintaining relative to a followed object. In other implementations, the request generation system 230 can also provide additional information with the request. By way of nonlimiting example, the request generation system 230 can also identify constraints for carrying out the request. In some examples, such constraints may include a range of acceptable inputs that would satisfy the requirements of the request. For example, such constraints may include a minimum and/or maximum time gap range, a minimum and/or maximum reference velocity, and/or a minimum and/or maximum acceleration that should be used to carry out the request. In one example, a request to attain an increased velocity may include a maximum acceleration for attaining the desired velocity, e.g., to avoid excessive acceleration. In another example, a time gap range can be provided with a request to follow a leading vehicle. For example, and as discussed above, the time gap may be used to determine a velocity-dependent following distance, and thus a time gap range could be used to determine a range of acceptable distances. In implementations described herein, a constraint may include a time range containing the desired time. Thus, in the example of a desired 1.5-second time gap, a constraint generated by the request generation system 230 can include a minimum time gap of 1.2 seconds and a maximum time gap 1.8 seconds, for example. Of course, these values are for example only, and other maximum and/or minimum time gaps may be used instead. In at least some examples, such ranges (e.g., time gaps) may not produce uniform results. In such examples, the command controller(s) 232 may increasingly penalize accelerations associated with the maximum and/or minimum of the range (e.g., exponentially, linearly, etc. from a central value).

Similarly, when the request generation system 230 generates a reference velocity at which the vehicle is desired to travel, the request may also include one or both of a maximum velocity or a minimum velocity. In some examples, by including ranges, e.g., by including minimums and/or maximums with a request, controllers of the vehicle may better satisfy multiple requests.

The request generation system 230 may also associate other information with the requests, which information may be useful for determining a control of the vehicle. For example, the request generation component 230, when generating a request relative to an object, can also include instructions associated with the object. Such instructions may be in the form of flags, tags, or other information associated with the request. For example, consider a scenario in which a request to follow a leading vehicle is generated. As the vehicle slows and stops, e.g., at a red light, the driver of the leading vehicle may allow his vehicle to roll or coast forward, e.g., at a very slow rate. In some implementations, the vehicle 202 may accelerate to follow this rolling. However, in other instances, the request may include an instruction to treat the leading vehicle as stationary when the leading vehicle's velocity is equal to or below a threshold velocity. Thus, for example, the vehicle may remain stopped in the scenario described above, instead of creeping to follow the leading vehicle. Conversely, where additional information is needed in order to safely proceed through an intersection (e.g., when occlusions at an intersection preclude the vehicle 202 from obtaining sufficient information to proceed safely through the intersection), the additional instructions may comprise a request to "creep" forward (e.g., move forward very slowly in order to reduce occlusions).

In other examples, the command request may include other or additional instructions that define or constrain movement of an object in the environment. For instance, the command request may identify an object as irrelevant for collision purposes. In one example, when the vehicle 202 is alongside another vehicle, such as the second additional vehicle 106 in FIG. 1, the request generation system 230 can generate a request to fall behind, e.g., follow or merge behind, the second additional vehicle 106. The request may include information that ascribes a predicted movement or a predicted velocity to another object in the environment. For example, the request may include information indicating that the second vehicle is not collision relevant, e.g., by predicting that the second vehicle will stay in its current lane, by predicting that the second vehicle will maintain a current or predicted velocity, by predicting that the second vehicle will continue along a predicted or current trajectory, or the like, and thus the acceleration will not be based on a potential collision with the second additional vehicle 106. Practically, this may result in the vehicle 202 (or the vehicle 102 in FIG. 1) being controlled to allow the second additional vehicle 106 to move into position in front of the vehicle 202 (or the vehicle 102) more gradually, e.g., when compared to a case in which the second additional vehicle 106 is viewed as a threat to cut off or otherwise proceed in front of the vehicle 202 (or the vehicle 102).

In additional examples, the request generation system 230 can include an instruction to be more assertive when carrying out a request. For example, when the vehicle 102 is in a crowded intersection, and has been in the intersection for a relatively long amount of time, the request may include an instruction to proceed through the intersection, e.g., behind a vehicle or to attain some velocity with greater assertion. For example, this "assertive" instruction may be an instruction to the command controller(s) 232 to increase a gain, e.g., to calculate a higher acceleration, or to use a different command controller 232, altogether, temporarily in order to navigate the intersection. For example, an "assertive" instruction may cause a special controller, e.g., the third command controller 116-3 to determine the command acceleration for the request. In some implementations, the controller may have predetermined gains, e.g., which may be higher than a gain associated with other controllers. In other examples, the "assertive" instruction may indicate to the command controller(s) 232 and/or the control determination system 234 to assign a higher weight to the request/acceleration command. In at least some examples, such a third command controller 116-3 may not be an additional controller, but modifications to another controller.

The request generation system 230 can also provide information about importance of a request. By way of non-limiting example, consider an example in which the vehicle 202 is approaching a distant vehicle. The request generation system 230 can generate a request to follow the distant vehicle, but may indicate that the request is of lower importance, e.g., the request may be de-prioritized because the vehicle is so far away (and thus many attributes of the environment could change before the distant vehicle could legitimately be followed).

The command controller(s) 232 are configured to receive the various command requests and generate acceleration commands, such as the acceleration commands 118. In implementations described herein, an acceleration command may be generated for each command request. The command controller(s) 232 may include a plurality of controllers, each configured to generate an acceleration command from one or more different types of input control requests. In at least some examples, each control request type may be associated with a different command controller.

In one example, a first controller of the command controller(s) 232 may be configured to receive a reference velocity, e.g., a desired velocity, and determine an acceleration to achieve the desired velocity. The first controller may also be configured to receive a distance at which the desired velocity is to be achieved. An example of the first controller is provided as equation 1:

$$a_x = \frac{v}{v_{ref}} a_{ref} - k_v(d) * [v_{ref} - v] \tag{1}$$

Equation (1) generally represents an equation for determining a control acceleration $a_x$ (e.g., the acceleration at which the vehicle will be controlled in the environment in the longitudinal, x, direction). As illustrated, v is the current velocity of the vehicle and $v_{ref}$ is the desired velocity, e.g., specified by the control request. The term $a_{ref}$ may be a reference acceleration specified by the command request, and the term $k_v(d)$ is a controller gain. In some examples, the term $a_{ref}$ may be specified by the request generation system 230 as a way to provide additional flexibility in controlling the vehicle 200. For instance, the request generation system 230 may instruct a reference acceleration such that the vehicle, in implementing the request, will track a trajectory instead of a velocity setpoint. For example, the reference acceleration may function as a look-ahead to track an accelerating/decelerating trajectory. In the example, the controller gain is gain-scheduled as a function of the distance d specified in the command request, e.g., the distance between a current position and a position at which the vehicle 202 should obtain the desired velocity. The function may include a linear function, a non-linear function, an exponential function, or the like. In some implementations, the controller(s) may be gain-scheduled by look-up tables. In Equation 1, the controller gain may be scheduled to increase with a lower distance, e.g., such that the vehicle decelerates (or accelerates) more quickly closer to the specified position, to attain the reference velocity. In those examples where no distance is provided, the such gain may be set to zero (0). Such a first controller may be associated with one or more of a velocity control request type and/or a velocity at a given distance control request type.

In another example, a second command controller of the command controller(s) 232 may be configured to receive other types of control requests and determine control accelerations. For example, a second controller may be a cascade controller configured to determine a command acceleration based on a control request type associated with stopping the vehicle or a control request type associated with following an object. An example of the second controller is illustrated by Equations 2:

$$a_x = -k_v(d_{ratio}, t_c) * [k_p(d_{ratio}, t_c) * [d_{des} - d] - v_{rel}] \quad (2)$$

Equation (2) generally represents an equation for determining a control acceleration $a_x$ (e.g., the acceleration at which the vehicle will be controlled in the environment in the longitudinal, x, direction). As illustrated, this second controller includes two control gains, $k_v$ and $k_p$, each gain-scheduled as a function of a distance ratio, $d_{ratio}$, and a time to an estimated collision, $t_c$, (e.g., where both the vehicle 202 and the object maintain a current predicted trajectory). For example, the function may be a linear function, a non-linear function, an exponential function, or the like. In some instances, the controller may be gain-scheduled using look-up tables. Also in this example, the distance ratio may be a ratio of a desired distance to an actual distance. Accordingly, for example, when the command request is a request to follow a vehicle, the distance ratio may be a ratio of the desired distance at which the vehicle 202 is to follow the object, e.g., a lead vehicle, and an actual distance to the object. As described herein, the command request may include a time gap and thus the desired distance may be calculated using equation (3):

$$d_{des} = v_x * t_{gap} \quad (3),$$

where $v_x$ corresponds to a current longitudinal velocity and $t_{gap}$ corresponds to a desired time gap.

Also in this example, the time to collision may be determined using equation (4):

$$t_c = \frac{d}{v_{rel}} \quad (4)$$

In equation (4), d represents a current distance from the object and $v_{rel}$ represents a relative velocity between a reference or desired velocity, $v_{ref}$, and an actual velocity $v_x$, as generally shown in equation (5):

$$v_{rel} = v_{ref} - v_x, \quad (5)$$

Accordingly, the first controller shown in Equation (1) and the second controller embodied in Equation (2) are examples of controllers that utilize different controller gains to determine accelerations, based on a received command request. However, in other examples, the command controller(s) 232 may include different gain scheduling schemes. By way of non-limiting examples, the command controller(s) 232 may achieve a different type of behavior, e.g. a different acceleration, by modifying the controller gains, such as the second controller gain. By way of non-limiting example, in an example in which the received command request includes a prioritization of an action, e.g., a request to assertively proceed through a busy intersection, the $k_p$ gain of the second controller may be scaled up (e.g., linearly, exponentially, non-linearly, etc.) to increase the initial acceleration command. In some examples, the controller gain for certain cases may be predetermined, e.g., stored in a lookup table or other database for use by the command controller(s) 232. In some examples, other flags (additional information) passed to such a cascade controller will modify the gains to cause the vehicle 202 to "creep" forward (e.g., slowly move forward in a longitudinal direction). Of course, additional or alternative modifications are contemplated for modifying such a cascade controller.

In those examples in which a range is specified (e.g., a max and min time gap, max and min velocity, and the like), the controller may be run (or otherwise executed) in order to produce commands (command accelerations) associated with each of the maximum and minimum values of the ranges provided. In such examples, both command accelerations may be passed to the control determination component 234.

In some examples, the command controller(s) 232 will generate a single acceleration for each received control request. In other examples, however, the command controller(s) 232 may generate multiple accelerations for a single command request. By way of non-limiting example, when the command request includes constraints, such as a minimum and/or maximum time gap, velocity, and/or acceleration, different accelerations associated with one or more of these minimums and/or maximums can be generated. Again, though described herein with respect to longitudinal accelerations, such description is not meant to be so limiting. In some examples, for example, such controllers may comprise, for example, additional controls, such as, but not limited to, steering, steering rates, etc.

Once generated by the command controller(s) 232, the acceleration commands may be received by the control determination component 234. The control determination component 234 is configured to determine an acceleration at which the vehicle 202 is to be controlled along a travel path, e.g., a longitudinal acceleration along the travel path. For example, the control determination component 234 may determine a control acceleration for the vehicle as a function of each of the acceleration commands generated by the command controller(s) 232. Example techniques for determining a control acceleration based on multiple candidate accelerations are described, for example, in U.S. patent application Ser. No. 16/160,594 for "Responsive Vehicle Control," filed on Oct. 15, 2018, the entire disclosure of which is hereby incorporated by reference.

In at least some examples, the planning system 226 may iteratively determine such controls at various points in the future (either spatially and/or temporally) in order to determine a preferred trajectory for controlling the vehicle 202. As a non-limiting example, the processes described above may be used to determine commands (e.g., accelerations) for each of 1 s, 2 s, 3 s, and 4 s in the future, though any other spatial and/or temporal intervals are contemplated.

In at least one example, the localization system 220, the perception system 222, the prediction system 224, and/or the planning system 226 (and/or the components of the planning system 226) can process sensor data, as described above, and can send their respective outputs over network(s) 238, to computing device(s) 240. In at least one example, the localization system 220, the perception system 222, the prediction system 224, and/or the planning system 226 can send their respective outputs to the computing device(s) 240 at a particular frequency, after a lapse of a predetermined period of time, in near real-time, etc.

In at least one example, the vehicle computing device(s) 204 can also include the system controllers 228, which can be configured to control steering, propulsion, braking, safety, emitters, communication, and other systems of the vehicle 202. These system controller(s) 228 can communicate with and/or control corresponding systems of the drive module(s) 214 and/or other components of the vehicle 202. For example, the system controller(s) 228 may cause the vehicle to traverse along a drive path determined by the planning system 226, e.g., at an acceleration determined by the control determination component 234.

In at least one example, the sensor system(s) 206 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), etc. The sensor system(s) 206 can include multiple instances of each of these or other types of sensors. For instance, the LIDAR sensors can include individual LIDAR sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the vehicle computing device(s) 204. Additionally and/or alternatively, the sensor system(s) 206 can send sensor data, via the network(s) 238, to the computing device(s) 240 at a particular frequency, after a lapse of a predetermined period of time, in near real-time, etc.

The vehicle 202 can also include the one or more emitters 208 for emitting light and/or sound. The emitter(s) 208 in this example can include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 208 in this example also include exterior emitters. By way of example and not limitation, the exterior emitters can include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., or the like. In at least one example, the emitter(s) 208 can be disposed at various locations about the exterior and/or interior of the vehicle 202.

The vehicle 202 can also include the communication connection(s) 210 that enable communication between the vehicle 202 and other local or remote computing device(s). For instance, the communication connection(s) 210 can facilitate communication with other local computing device(s) on the vehicle 202 and/or the drive module(s) 214. Also, the communication connection(s) 310 can allow the vehicle to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 can include physical and/or logical interfaces for connecting the vehicle computing device(s) 204 to another computing device or a network, such as network(s) 238. For example, the communications connection(s) 210 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

In at least one example, the vehicle 202 can also include the drive module(s) 214. In some examples, the vehicle 202 can have a single drive module 214. In at least one example, if the vehicle 202 has multiple drive modules 214, individual drive modules 214 can be positioned on opposite ends of the vehicle 202 (e.g., the front and the rear, etc.). In at least one example, the drive module(s) 214 can include sensor system(s) to detect conditions of the drive module(s) 214 and/or the surroundings of the vehicle 202. By way of example and not limitation, the sensor system(s) 206 can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, LIDAR sensors, RADAR sensors, etc. Some sensors, such as the wheel encoder(s) can be unique to the drive module(s) 214. In some cases, the sensor system(s) on the drive module(s) 214 can overlap or supplement corresponding systems of the vehicle 202 (e.g., the sensor system(s) 206).

The drive module(s) 214 can include many of the vehicle systems, including a high voltage battery, a motor to propel the vehicle 202, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 214 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive module(s) 214. Furthermore, the drive module(s) 214 also include communication connection(s) that enable communication by the respective drive module with other local or remote computing device(s).

As described above, the vehicle 202 can send sensor data to the computing device(s) 240, via the network(s) 238. In some examples, the vehicle 202 can send raw sensor data to the computing device(s) 240. In other examples, the vehicle 202 can send processed sensor data and/or representations of sensor data to the computing device(s) 240 (e.g., data output from the localization system 220, the perception system 222, the prediction system 224, and/or the planning system 226). In some examples, the vehicle 202 can send sensor data to the computing device(s) 240 at a particular frequency, after a lapse of a predetermined period of time, in near real-time, etc.

The computing device(s) 240 can receive the sensor data (raw or processed) from the vehicle 202 and/or one or more other vehicles and/or data collection devices, and can perform drive planning functions, including some or all of the functions ascribed to the planning system 226, including the request generation component 230, the command controller(s) 232, and/or the control determination component 234. In at least one example, the computing device(s) 240 can include processor(s) 242 and memory 244 communicatively coupled with the processor(s) 242. In the illustrated example, the memory 244 of the computing device(s) 240 stores a planning component 246, for example. In at least one example, the planning component 246 can correspond to some or all of the planning system 226 detailed above.

The processor(s) 216 of the vehicle 202 and the processor(s) 242 of the computing device(s) 240 can be any suitable processor capable of executing instructions to process data and perform operations as described herein. By way of example and not limitation, the processor(s) 216, 242 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 218, 244 are examples of non-transitory computer-readable media. Memory 218, 244 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

While FIG. 2 is illustrated as a distributed system, in alternative examples, components of the vehicle 202 can be associated with the computing device(s) 240 and/or components of the computing device(s) 240 can be associated with the vehicle 202. That is, the vehicle 202 can perform one or more of the functions associated with the computing device(s) 24038, and vice versa. Moreover, although various systems and components are illustrated as being discrete systems, the illustrations are examples only, and more or fewer discrete systems may perform the various functions described herein.

FIG. 3 is a flowchart showing an example method involving vehicle control as described herein. Specifically, FIG. 3 illustrates a method 300 in which objects in the environment are used to determine an acceleration of a vehicle along a drive path. The method illustrated in FIG. 3 is described with reference to the vehicles 102 and/or 202 shown in FIGS. 1 and 2 for convenience and ease of understanding. However, the method illustrated in FIG. 3 is not limited to being performed using the vehicles 102, 202, and can be implemented using any of the other vehicles described in this application, as well as vehicles other than those described herein. Moreover, the vehicles 102, 202 described herein are not limited to performing the method illustrated in FIG. 3.

The method 300 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the method 300 can be combined in whole or in part with other methods.

At 302, the method 300 can include receiving a request to navigate a vehicle relative to an object in an environment. For example, and as described above, a vehicle 202 may include or be associated with one or more computing devices 204 that include the planning system 226, and the planning system 226 can include the request generation component 230. The planning system 226 may receive information from one or more sensor systems 206, the localization system 220, the perception system 222, the prediction system 224, the maps 236, and/or other sources to determine one or more objects or conditions in the environment and the request generation system 230 can determine one or more requests for navigating relative to objects/conditions. In some examples, the request generation system 230 can generate a request including an action and information for performing the action. The information for performing the action may, depending on the action, include one or more of velocity information, distance information, time information, and/or acceleration information. As described further herein, multiple requests may be received, e.g., each corresponding to a different object or condition. In at least some examples, a request type may be determined in accordance with a policy on the vehicle (e.g., by evaluation of temporal logic formulae, evaluation of scenarios, and the like).

At 304, the method 300 can include determining, based on the request, a controller from a plurality of controllers. For example, and as described above, the requests may specify different information, e.g., velocity information, distance information time information, and/or acceleration information, and the planning system 226 can include different command controllers, such as the command controller(s) 232, for determining accelerations for executing the control request. In at least some examples, various request control types may be associated with an command controller. As non-limiting examples, a velocity control and velocity control at a distance type may be associated with a first command controller, whereas a stop and/or follow request type may be associated with a second command controller. In examples described further herein, different command controllers may have different controller gains. For instance, the different gains may be gain-scheduled as functions of different information provided in or discernable from the control request.

At 306, the method 300 can include receiving additional information and/or constraints associated with the request. For example, and as described herein, in addition to the velocity, distance, and/or time information, some requests may include additional constraints or features useful for determining a control acceleration for complying with the request. By way of non-limiting example, a request may prioritize or de-prioritize the requested action relative to other requests, including information for assertive behavior, include information for creeping behavior, and the like. Additionally, or alternatively, a request may include a constraint, including but not limited to, a minimum, a maximum, and/or a range associated with one or more parameters. For instance, instead of or in addition to a target time gap to maintain relative to a leading vehicle, the request may include a range of acceptable time gaps. Moreover, to promote a smooth ride for a passenger, a request to change a velocity of a vehicle may include a minimum and/or maximum acceleration for complying with the request.

At 308, the method 300 can include determining, by the controller and based on the additional information and/or the constraints, an acceleration command. For example, the acceleration command may be an acceleration (or acceleration range) at which the vehicle can be controlled to comply with the received request. Thus, for example, for each request, 308 may determine a different acceleration (or acceleration range). In implementations described herein, the acceleration may be a longitudinal acceleration determined by the command controller.

At 310, the method 300 can include determining, based on the acceleration command and additional acceleration commands associated with additional objects (or features or conditions, as described herein) an acceleration for controlling the vehicle. For example, as noted above, the command controller can determine an associated command acceleration or command acceleration range for complying with each of a plurality of command requests. Such determinations may be determined in accordance with method 300 by performing each of 302 through 308 for each additional object, environmental condition, etc. At 310, each of the acceleration commands, e.g., associated with each request, can be considered to determine an acceleration for controlling the vehicle. The control acceleration may be determined as a function of each of the acceleration commands, for example. Moreover, and as described herein, control accelerations can be determined iteratively, e.g., based on all commands generated for a specific time frame or time period. For example, the command acceleration may be a longitudinal acceleration for a specific point (or time) on a trajectory or travel path. In at least some examples, determinations at 310 may be performed for each of a sequence of future positions and/or times of the vehicle so as to determine a trajectory in accordance with a receding horizon technique. In such examples, objects may be propagated forward in accordance with predicted motion of the objects.

At 312, the method 300 can include controlling the vehicle according to the acceleration. As described above, the vehicle computing device(s) 204 can include one or more system controllers 228, which can be configured to control steering, propulsion, braking, safety emitters, communication, and other systems of the vehicle 202. These system controller(s) 228 can communicate with and/or control corresponding systems of the drive module(s) 214 and/or other components of the vehicle 202. In at least one example, the system controller(s) 228 can receive the acceleration as a component of a trajectory and can communicate with and/or control corresponding systems of the drive module(s) 214 and/or other components of the vehicle 202 such to cause the vehicle 202 to navigate along the trajectory.

An example of the method 300 now will be described with reference to FIG. 1. Specifically, at 302, the vehicle computing device(s) 110, e.g., using a planning system, can receive a plurality of control requests 114 for controlling the vehicle through the environment 100, e.g., relative to objects in the environment 100. The control requests may be generated by the request generation system 112 and may include information about a requested velocity, distance, and/or time. At 304, the vehicle computing device(s) 112, e.g., using the planning system and/or based on individual of the control requests 114, may determine an command controller, e.g., from the command controller(s) 116, for computing an acceleration to comply with individual of the control requests 114. For example, a first command controller may have a first controller gain, which may be gain-scheduled as a distance of the vehicle 102 to a point in the distance, e.g., a point to reach a lower velocity. A second command controller may have a second controller gain, which may be gain-scheduled as a function of one or more of a distance to an object or a position and/or a time to reach the object or the position. For example, a control request to decelerate to a velocity at the position 130 may be processed using the first command controller, whereas a second control request to follow the first additional vehicle 104 may be processed using the second command controller. At 306, the vehicle computing device(s) 110, may also receive additional information and/or constraints associated with the requests 114. For example, the additional information may include special options as described herein and the constraints can include maximum and/or minimum time gaps, accelerations, velocities, or the like.

At 308, the command controller(s) 116 can generate the acceleration commands 118. Each of the acceleration commands may be associated with a received control request 114. The acceleration commands 118 may be a longitudinal acceleration and/or a range of longitudinal accelerations that cause the vehicle to comply with the request. As will be appreciated, the acceleration commands 118 may be at odds with each other. Accordingly, at 310, the control determination system 120 can determine an acceleration for the controlling the vehicle 102, e.g., based on the acceleration commands. In some examples, the control determination system 120 can determine the control acceleration as a weighted average of each of the acceleration commands 118. At 312, the vehicle 102 can be controlled according to the acceleration determined by the control determination system 120.

As will be appreciated, as the vehicle moves through the environment, objects in the environment are ever-changing. Accordingly, the method 300 may be carried out iteratively. For example, status of objects in the environment, including the control requests, may be determined in near real-time, e.g., at intervals of from about 0.5 seconds to about 3 seconds. Moreover, as objects change positions, velocities, attitudes, and the like, relative to the vehicle, new objects or conditions may be may be included and objects previously included in the control requests may be excluded, e.g., as those objects/conditions apply or no longer apply.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A: An example autonomous vehicle includes: a first controller for determining a first acceleration based at least in part on first input information and a first controller gain; a second controller for determining a second acceleration based at least in part on second input information and a second controller gain; one or more processors; and memory storing processor-executable instructions that, when executed by the one or more processors, cause the autonomous vehicle to perform acts comprising: receiving a first request for controlling the autonomous vehicle, the first request comprising first velocity information and distance information; determining, using the first controller, a first acceleration based at least in part on the first request, receiving a second request for controlling the autonomous vehicle, the second request comprising second velocity information; determining, using the second controller, a second acceleration based at least in part on the second command; determining, based at least in part on the first acceleration and the second acceleration, a command acceleration for a point along a trajectory for controlling the vehicle; and controlling the vehicle based at least in part on the trajectory.

B: The autonomous vehicle of example A, wherein the first request includes a request to follow an object and the distance information includes a time gap to maintain between the vehicle and the object, and wherein the first controller gain is based at least in part on at least one of a distance between the vehicle and the object, a desired distance between the vehicle and the object, or a time associated with an estimated collision of the vehicle and the object.

C: The autonomous vehicle of example A or example B, wherein the second request includes a target velocity at which to control the autonomous vehicle and a distance from a current position at which to achieve the target velocity, and wherein the second controller gain is based at least in part on the distance.

D: The autonomous vehicle of any one of example A through example C, wherein at least one of: the distance information comprises a time gap range, the first velocity information includes a first velocity range, or the first request further includes an acceleration range for the first acceleration.

E: The autonomous vehicle of any one of example A through example D, wherein at least one of the first request includes first additional information or the second request includes second additional information, the first additional information and the second additional information comprising at least one of: an instruction to assign a constant velocity to an object; an instruction to assign a predicted movement to the object; an instruction to cause the vehicle to move forward slowly from a stop; an instruction to increase the first acceleration or the second acceleration; or an instruction to de-prioritize the respective first request or the second request relative to the other of the first request or the second request or other requests.

F: An example method includes: receiving a first request to navigate relative to a first condition in an environment, the first request comprising first information including at least one of first velocity information, first distance information, or first time information; receiving a second request to navigate relative to a second condition in the environment, the second request comprising second information comprising at least one of second velocity information, second distance information, or second time information; determining, using a first command controller, a first command for controlling a vehicle in accordance with the first request; determining, using a second command controller, a second command for controlling the vehicle in accordance with the second request; and determining, based at least in part on the first command and the second command, a control command for a point along a trajectory for controlling the vehicle.

G: The method of example F, wherein: the first condition comprises one or more of a stop sign in the environment of a first object proximate the vehicle; the first request is a request to stop the vehicle or a request to follow the first object, the first information includes the first distance information, the first distance information including a first distance from a current position of the vehicle to a stopping position or a second distance to maintain from the first object, and the first controller has a first controller gain based at least in part on one or more of the first distance, the second distance, a first desired distance between the vehicle and the first object, a second desired distance between the vehicle and the stopping position, a first time associated with the first distance, or a second time associated with the second distance.

H: The method of example F or example G, wherein: the first condition comprises a leading vehicle in the environment, the first request comprises a request to follow the leading vehicle, and the first information comprises at least one of a velocity of the leading vehicle and a distance to maintain behind the leading vehicle.

I: The method of any one of example F through example H, wherein the first command, the second command and the control command are longitudinal accelerations along a direction of travel of the autonomous vehicle, and wherein the first controller comprises a first gain and the second controller comprises a second gain different from the first gain.

J: The method of any one of example F through example I, wherein at least one of: the first information or the second information includes at least one of a minimum time gap or a maximum time gap, the first velocity information or the second velocity information includes at least one of a minimum velocity or a maximum velocity, or the first request or the second request further includes at least one of a minimum acceleration or a maximum acceleration.

K: The method of any one of example F through example J, wherein: the second request is a request to attain a second velocity at a distance from a current position; the second information includes the second velocity information and the second distance information, the second velocity information comprising the second velocity and the second distance information comprising the distance from the current position; and the second controller has a second controller gain based at least in part on the distance from the current position.

L: The method of any one of example F through example K, wherein at least one of the first request includes first additional information or the second request includes second additional information, the first command being further determined based at least in part on the first additional information and the second command being further based at least in part on the second additional information.

M: The method of any one of example F through example L, wherein the first condition comprises a dynamic object and the first additional information comprises an instruction to associate a predetermined velocity or a predetermined trajectory to the first object.

N: The method of any one of example F through example M, wherein the first additional information comprises an instruction to cause the first controller to determine an increased acceleration, the method further comprising: altering a gain associated with the first controller based at least in part on receiving the instruction.

O: The method of any one of example F through example N, wherein the first additional information comprises an instruction to de-prioritize the first request relative to the second request or additional requests, the method further comprising: associating a weighting factor with the first command based at least in part on the instruction.

P: An example non-transitory computer-readable medium stores a set of instruction that, when executed, cause one or more processors to perform operations comprising: receiving a first request to navigate relative to a first condition in an environment of a vehicle, the first request comprising first information including at least one of first velocity information, first distance information, or first time information; receiving a second request to navigate relative to a second condition in the environment, the second request comprising second information comprising at least one of second velocity information or second distance information; determining, based at least in part on a first command controller, a first command for controlling the vehicle in accordance with the first request; determining, based at least in part on a second command controller, a second command for controlling the vehicle in accordance with the second request; and determining, based at least in part on the first acceleration and the second acceleration, a control command for controlling the vehicle.

Q: The non-transitory computer-readable medium of example P, wherein: the first request is a request to stop the vehicle or a request to follow a first object associated with the first condition, the first information includes the first distance information, the first distance information including a first distance from a current position of the vehicle to a stopping position of the vehicle or a second distance to maintain from the first object, and the first controller has a first controller gain, the first controller based at least in part on one or more of the first distance, the second distance, a first desired distance between the vehicle and the first object, a second desired distance between the vehicle and the stopping position, a first time associated with the first distance, or a second time associated with the second distance.

R: The non-transitory computer-readable medium of example P or example Q, wherein: the second request is a request to attain a second velocity at a reference distance from a current position; the second information includes the second velocity information and the second distance information, the second velocity information comprising the second velocity and the second distance information comprising the distance from the current position; and the second controller has a second controller gain based at least in part on the reference distance from the current position.

S: The non-transitory computer-readable medium of any one of example P through example R, wherein at least one of the first request includes first additional information or the second request includes second additional information, the first additional information and the second additional information comprising at least one of: an instruction to assign a constant velocity to a first object associated with the first condition or a second object associated with the second condition; an instruction to assign a predicted movement to the first object or the second object; an instruction to move forward slowly; an instruction to increase or decrease the first acceleration or the second acceleration; or an instruction to de-prioritize the respective first request or the second request relative to the other of the first request or the second request or other requests.

T: The non-transitory computer-readable medium of any one of example P through example S, wherein at least one of: the first information or the second information includes at least one of a minimum time gap or a maximum time gap, the first velocity information or the second velocity information includes at least one of a minimum velocity or a maximum velocity, or the first request or the second request further includes at least one of a minimum acceleration or a maximum acceleration; the first controller determines a first maximum command acceleration and a first minimum acceleration; and the second controller determines a second maximum command acceleration and a second minimum acceleration.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:
1. An autonomous vehicle comprising:
a first controller for determining first accelerations based at least in part on first input information and a first controller gain;

a second controller for determining second accelerations based at least in part on second input information and a second controller gain;
one or more processors; and
memory storing processor-executable instructions that, when executed by the one or more processors, cause the autonomous vehicle to perform acts comprising:
receiving a first request for controlling the autonomous vehicle, the first request comprising first velocity information and distance information;
determining, using the first controller, a first acceleration based at least in part on the first request;
receiving a second request for controlling the autonomous vehicle, the second request comprising second velocity information;
determining, using the second controller, a second acceleration based at least in part on the second request;
determining, based at least in part on the first acceleration and the second acceleration, a command acceleration for a point along a trajectory for controlling the vehicle; and
controlling the vehicle based at least in part on the trajectory.

2. The autonomous vehicle of claim 1, wherein the first request includes a request to follow an object and the distance information includes a time gap to maintain between the vehicle and the object, and wherein the first controller gain is based at least in part on at least one of a distance between the vehicle and the object, a desired distance between the vehicle and the object, or a time associated with an estimated collision of the vehicle and the object.

3. The autonomous vehicle of claim 2, wherein the second request includes a target velocity at which to control the autonomous vehicle and a distance from a current position at which to achieve the target velocity, and wherein the second controller gain is based at least in part on the distance.

4. The autonomous vehicle of claim 1, wherein at least one of: the distance information comprises a time gap range, the first velocity information includes a first velocity range, or the first request further includes an acceleration range for the first acceleration.

5. The autonomous vehicle of claim 1, wherein at least one of the first request includes first additional information or the second request includes second additional information, the first additional information and the second additional information comprising at least one of:
an instruction to assign a constant velocity to an object;
an instruction to assign a predicted movement to the object;
an instruction to cause the vehicle to move forward slowly from a stop;
an instruction to increase the first acceleration or the second acceleration; or
an instruction to de-prioritize the respective first request or the second request relative to the other of the first request or the second request or other requests.

6. A method comprising:
receiving a first request to navigate relative to a first condition in an environment, the first request comprising first information including at least one of first velocity information, first distance information, or first time information;
receiving a second request to navigate relative to a second condition in the environment, the second request comprising second information comprising at least one of second velocity information, second distance information, or second time information;
determining, using a first command controller and a first controller gain, a first command for controlling a vehicle in accordance with the first request;
determining, using a second command controller and a second controller gain, a second command for controlling the vehicle in accordance with the second request; and
determining, based at least in part on the first command and the second command, a control command for a point along a trajectory for controlling the vehicle,
wherein the first command, the second command, and the control command are longitudinal accelerations along a direction of travel of the autonomous vehicle.

7. The method of claim 6, wherein:
the first condition comprises one or more of a stop sign in the environment of a first object proximate the vehicle;
the first request is a request to stop the vehicle or a request to follow the first object,
the first information includes the first distance information, the first distance information including a first distance from a current position of the vehicle to a stopping position or a second distance to maintain from the first object, and
the first controller gain is based at least in part on one or more of the first distance, the second distance, a first desired distance between the vehicle and the first object, a second desired distance between the vehicle and the stopping position, a first time associated with the first distance, or a second time associated with the second distance.

8. The method of claim 7, wherein:
the second request is a request to attain a second velocity at a distance from a current position;
the second information includes the second velocity information and the second distance information, the second velocity information comprising the second velocity and the second distance information comprising the distance from the current position; and
the second controller gain is based at least in part on the distance from the current position.

9. The method of claim 6, wherein:
the first condition comprises a leading vehicle in the environment,
the first request comprises a request to follow the leading vehicle, and
the first information comprises at least one of a velocity of the leading vehicle and a distance to maintain behind the leading vehicle.

10. The method of claim 6, wherein at least one of:
the first information or the second information includes at least one of a minimum time gap or a maximum time gap,
the first velocity information or the second velocity information includes at least one of a minimum velocity or a maximum velocity, or
the first request or the second request further includes at least one of a minimum acceleration or a maximum acceleration.

11. The method of claim 6, wherein at least one of the first request includes first additional information or the second request includes second additional information, the first command being further determined based at least in part on the first additional information and the second command being further based at least in part on the second additional information.

12. The method of claim 11, wherein the first condition comprises a dynamic object and the first additional information comprises an instruction to associate a predetermined velocity or a predetermined trajectory to the first object.

13. The method of claim 11, wherein the first additional information comprises an instruction to cause the first controller to determine an increased acceleration, the method further comprising:
   altering the first controller gain based at least in part on receiving the instruction.

14. The method of claim 11, wherein the first additional information comprises an instruction to de-prioritize the first request relative to the second request or additional requests, the method further comprising:
   associating a weighting factor with the first command based at least in part on the instruction.

15. A non-transitory computer-readable medium storing a set of instruction that, when executed, cause one or more processors to perform operation comprising:
   receiving a first request to navigate relative to a first condition in an environment of a vehicle, the first request comprising first information including at least one of first velocity information, first distance information, or first time information;
   receiving a second request to navigate relative to a second condition in the environment, the second request comprising second information comprising at least one of second velocity information or second distance information;
   determining, based at least in part on a first command controller and a first controller gain, a first command for controlling the vehicle in accordance with the first request;
   determining, based at least in part on a second command controller and a second controller gain, a second command for controlling the vehicle in accordance with the second request; and
   determining, based at least in part on the first command and the second command, a control command for controlling the vehicle,
   wherein the first command, the second command, and the control command are longitudinal accelerations along a direction of travel of the autonomous vehicle.

16. The non-transitory computer-readable medium of claim 15, wherein:
   the first request is a request to stop the vehicle or a request to follow a first object associated with the first condition,
   the first information includes the first distance information, the first distance information including a first distance from a current position of the vehicle to a stopping position of the vehicle or a second distance to maintain from the first object, and
   the first controller gain is based at least in part on one or more of the first distance, the second distance, a first desired distance between the vehicle and the first object, a second desired distance between the vehicle and the stopping position, a first time associated with the first distance, or a second time associated with the second distance.

17. The non-transitory computer-readable medium of claim 16, wherein:
   the second request is a request to attain a second velocity at a reference distance from a current position;
   the second information includes the second velocity information and the second distance information, the second velocity information comprising the second velocity and the second distance information comprising the distance from the current position; and
   the second controller gain is based at least in part on the reference distance from the current position.

18. The non-transitory computer-readable medium of claim 15, wherein at least one of the first request includes first additional information or the second request includes second additional information, the first additional information and the second additional information comprising at least one of:
   an instruction to assign a constant velocity to a first object associated with the first condition or a second object associated with the second condition;
   an instruction to assign a predicted movement to a first object associated with the first condition or a second object associated with the second condition;
   an instruction to move forward slowly;
   an instruction to increase or decrease a first acceleration associated with the first command or a second acceleration associated with the second command; or
   an instruction to de-prioritize the respective first request or the second request relative to the other of the first request or the second request or other requests.

19. The non-transitory computer-readable medium of claim 15, wherein:
   at least one of the first information or the second information includes at least one of a minimum time gap or a maximum time gap, the first velocity information or the second velocity information includes at least one of a minimum velocity or a maximum velocity, or the first request or the second request further includes at least one of a minimum acceleration or a maximum acceleration;
   the first controller determines a first maximum command acceleration and a first minimum acceleration; and
   the second controller determines a second maximum command acceleration and a second minimum acceleration.

* * * * *